Nov. 24, 1931.   R. G. LOCKETT   1,833,491
CONTROL SYSTEM FOR ELECTRIC MOTOR OPERATED ROTARY DEVICES
Filed July 12, 1929   3 Sheets-Sheet 1
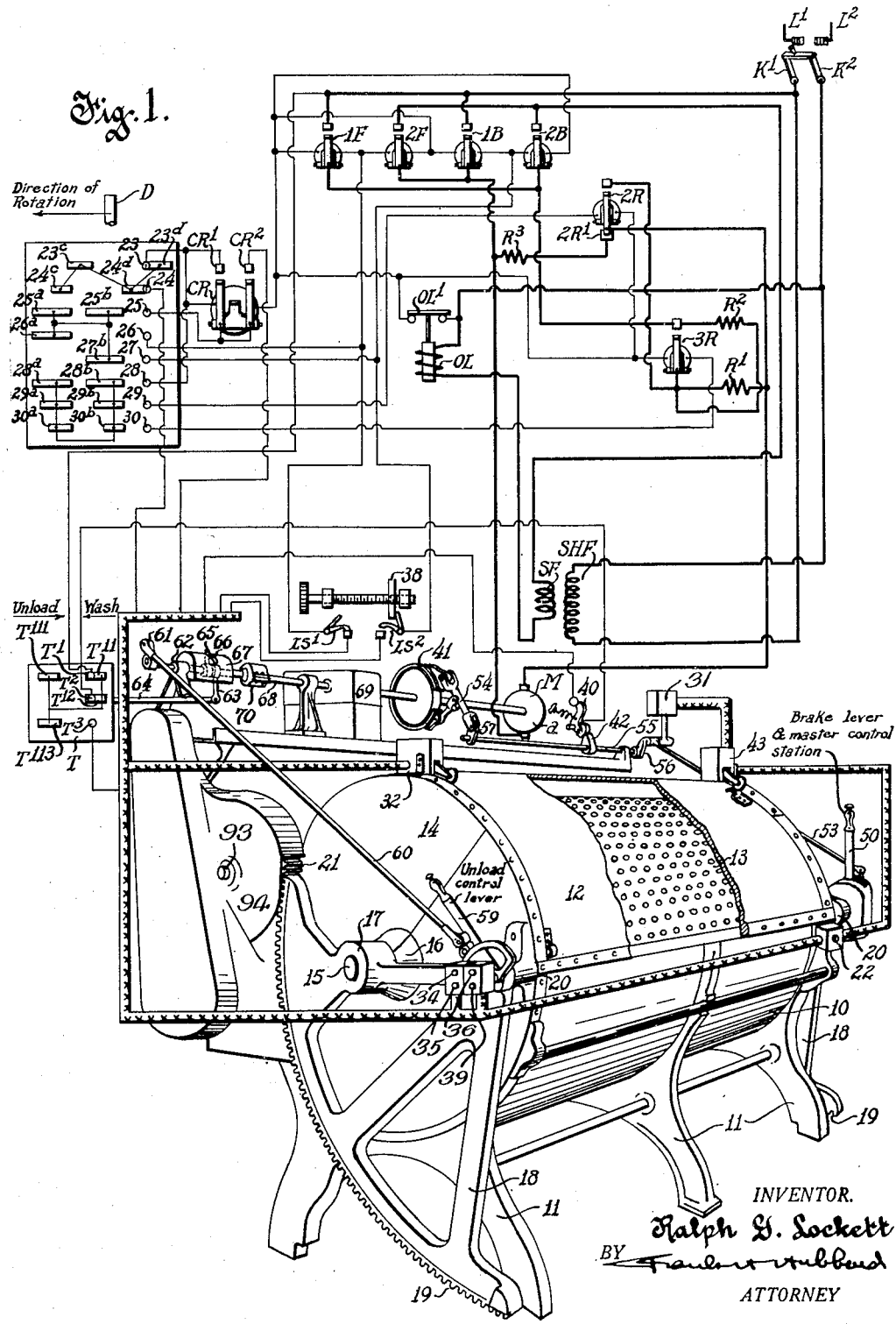
INVENTOR.
Ralph G. Lockett
BY Frederick Hubbard
ATTORNEY Nov. 24, 1931.   R. G. LOCKETT   1,833,491
CONTROL SYSTEM FOR ELECTRIC MOTOR OPERATED ROTARY DEVICES
Filed July 12, 1929   3 Sheets-Sheet 2
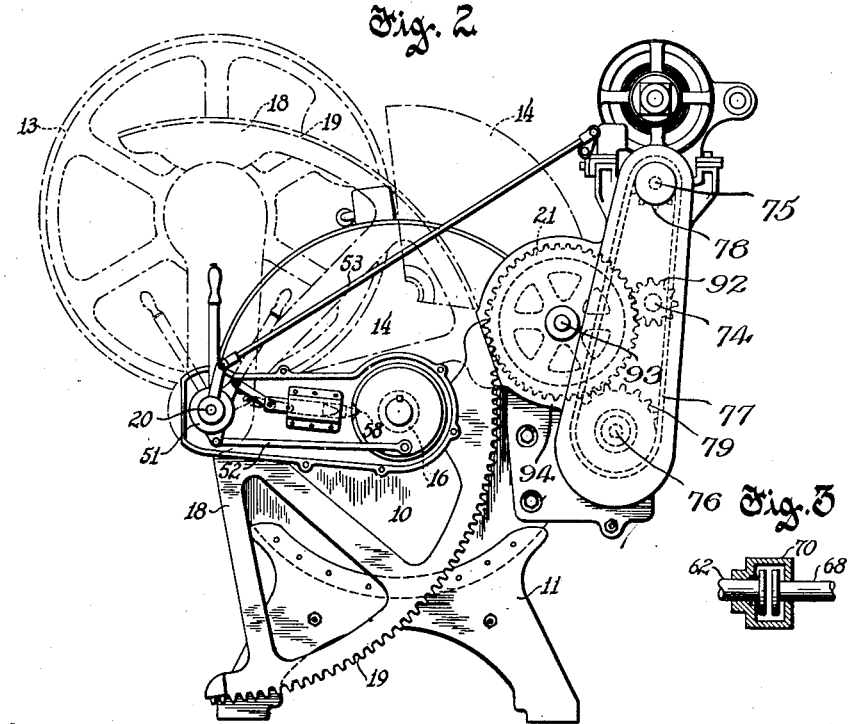
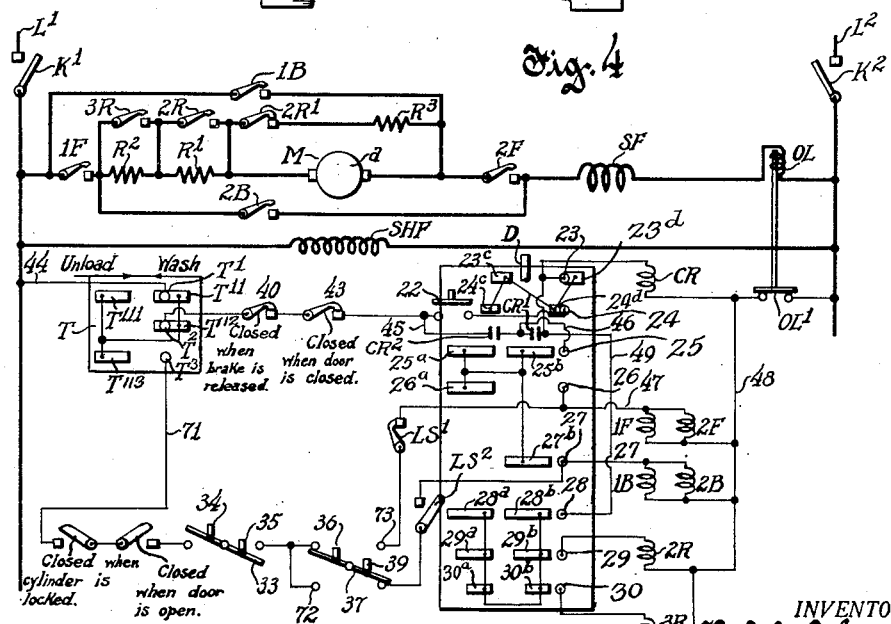
INVENTOR.
Ralph G. Lockett
BY
ATTORNEY Nov. 24, 1931.  R. G. LOCKETT  1,833,491

CONTROL SYSTEM FOR ELECTRIC MOTOR OPERATED ROTARY DEVICES

Filed July 12, 1929   3 Sheets-Sheet 3

Inventor
Ralph G. Lockett
By Frank H. Hubbard
Attorney

Patented Nov. 24, 1931

1,833,491

UNITED STATES PATENT OFFICE

RALPH G. LOCKETT, OF WAUWATOSA, WISCONSIN, ASSIGNOR TO CUTLER-HAMMER, INC., OF MILWAUKEE, WISCONSIN, A CORPORATION OF DELAWARE

CONTROL SYSTEM FOR ELECTRIC MOTOR OPERATED ROTARY DEVICES

Application filed July 12, 1929. Serial No. 377,884.

This invention relates to improvements in control systems for electric motor operated rotary devices, and the invention more particularly relates to improvements in control means for electric driving motors of washing machines.

An object of the invention is to provide novel means for effecting automatic cyclic control of the motor including periodic reversal and acceleration thereof, together with manually operable means for commutating the motor circuit connections to effect operation thereof in reverse directions selectively throughout predetermined limits and under insured conditions of relatively slow speed.

Another object is to provide a control system for electrically operated washing machines of the aforementioned type wherein the mechanical and electrical elements of the device are so arranged and correlated as to facilitate and insure operation of the device in a predetermined sequence of steps.

Another object is to provide simple and efficient control means for a washing machine of the character aforementioned, wherein all of the mechanical and electrical elements of the device are properly protected during each step of the operating cycle.

Another and more specific object is to provide means for insuring inclusion of predetermined values of resistance in the motor circuit upon completion thereof for initiation of the washing cycle and/or for initiation of the unloading cycle.

Other objects and advantages of the invention will hereinafter appear.

The accompanying drawings illustrate an embodiment of the invention which will now be described, it being understood that the invention is susceptible of embodiment in other forms without departing from the scope of the appended claims.

In the drawings, Figure 1 illustrates schematically and diagrammatically a washing machine having my improved motor control means applied thereto.

Fig. 2 is an end elevation of the washing machine illustrated in Fig. 1.

Fig. 3 is a detail view, partly in elevation and partly in vertical section, of certain mechanical elements of the device.

Fig. 4 is an across the line diagram of the electrical control elements of the device.

Figure 5:
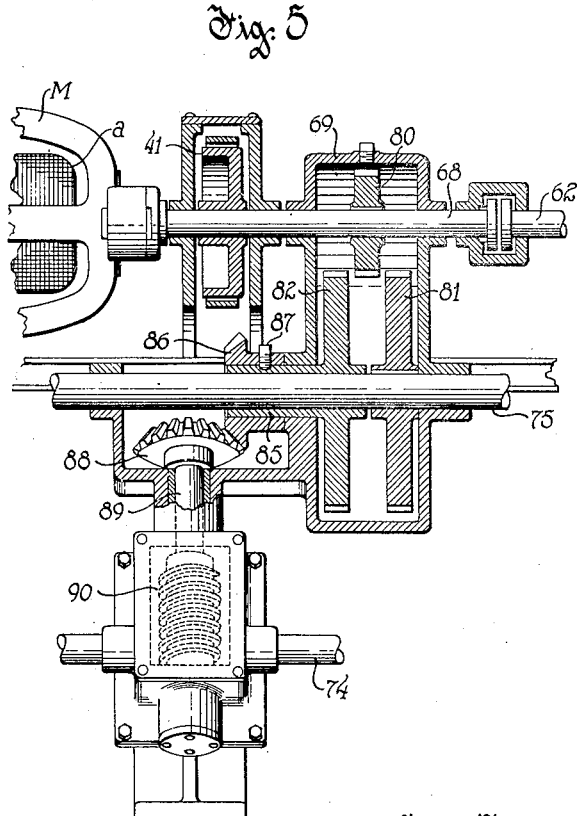
Fig. 5 is a detail view, partly in section and partly in elevation, illustrating the change-speed gearing and certain of the elements associated therewith.

Referring first to Figs. 1 and 2 of the drawings, the numeral 10 designates the stationary tub or casing of the washing machine, said tub as shown being preferably cylindrical, and the same is mounted horizontally upon suitable pedestals or supports 11.

The tub 10 is provided with a door or cover 12 which is preferably slidable upwardly to provide clearance for upward and outward bodily movement of the rotary inner cylinder or container 13 with respect thereto. Also as shown the end walls of the tub 10 are provided with segments 14 which are movable automatically to the dotted line position illustrated in Fig. 2 whereby clearance for the shaft ends 15 of the cylinder 13 is provided.

Said shaft ends 15 are supported within suitable bearings 16 in the end walls of the tub, and said shaft ends are further provided with bearings 17 in relatively large segmental lifting gears 18, the teeth of which are shown at 19. The gears 18 are pivotally supported by the tub 10 eccentrically of the shaft ends 15, as indicated at 20. Thus upon movement of suitable gearing 21 the gears 18 and the cylinder 13 carried thereby are lifted to the dotted line position illustrated in Fig. 2, whereby the material contained within cylinder 13 may be dumped through suitable doors (not shown) into suitable receptacles such as extractor baskets (not shown).

Also upon positioning of the various elements as shown in full lines in Figs. 1 and 2, the cylinder 13 is adapted to be operated throughout predetermined cycles by the motor M upon completion of the motor circuit connections by temporary closure of a push button switch 22 or the like,—said cycles including periodic reversal and acceleration control of the motor. The motor M is shown as being of the compound wound direct current type having an armature $a$, series field SF and shunt field SHF, but it is to be understood that other types of direct or alternating current motors may be employed if desired.

The mechanical and electrical control instrumentalities further include a drum shown diagrammatically and designated in general by the reference character D,—said drum being continuously rotatable unidirectionally by any suitable means such as a pilot motor (not shown). Said drum D is provided with stationary contacts 23 to 30, inclusive,—the contacts 25, 26 and 25, 27 being alternately engageable with connected groups of segments $25^a$, $26^a$ and $25^b$, $27^b$ for controlling the forward and reverse circuit connection of motor M. Drum D is further provided with connected groups of segments $28^a$, $29^a$, $30^a$ and $28^b$, $29^b$, $30^b$ for cooperation with contacts 28, 29 and 30 for acceleration control of motor M in each direction of operation thereof. Connected groups of segments $23^c$, $24^c$ and $23^d$, $24^d$ are also provided on drum D for alternative cooperation with contacts 23 and 24 in the respective "off" positions of the drum.

A relay CR having normally open contacts $CR^1$ and $CR^2$ is subject to energization control by push button switch 22 and said contacts 23, 24 and segments $23^c$, $24^c$ and $23^d$, $24^d$ of drum D. Completion of the circuit of motor M for operation thereof in a forward direction is dependent upon closure of a pair of single-pole electromagnetically operable switches 1F and 2F, and energization of the windings of said switches is dependent upon closure of relay CR and engagement of segments $25^a$, $26^a$ with contacts 25, 26 of drum D. Completion of the circuit of motor M for operation thereof in the reverse direction is dependent upon closure of a second pair of single-pole electromagnetically operable switches 1B and 2B, and energization of the windings of said switches is dependent upon closure of relay CR and engagement of segments $25^b$, $27^b$ with contacts 25, 27 of drum D. If desired, a double-pole switch might be substituted for each pair of switches 1F, 2F and 1B, 2B.

Acceleration control of motor M during operation thereof in each direction is dependent upon sequential closure of electromagnetically operable switches 2R and 3R to provide for exclusion of resistance sections $R^1$ and $R^2$. Energization of the winding of switch 2R is dependent upon closure of relay CR and engagement of segments $28^a$, $29^a$ or $28^b$, $29^b$ with contacts 28, 29 of the drum, and energization of the winding of switch 3R is likewise dependent upon closure of said relay CR and engagement of segments $28^a$, $30^a$ or $28^b$, $30^b$ with contacts 28, 30 of the drum. Each of the switches 2R, 3R is of the single-pole normally open type, and switch 2R is provided with normally closed contacts $2R^1$ for control of a resistance section $R^3$ in shunt to the motor armature, as hereinafter described.

Completion of certain of the aforementioned energizing circuits is further dependent upon "wash" positioning of a transfer switch T, wherein the connected group of segments $T^{11}$, $T^{12}$ engages contacts $T^1$, $T^2$; whereas upon movement of switch T to "unload" position the connected segments $T^{111}$, $T^{113}$ thereof are brought into engagement with contacts $T^1$, $T^3$ to provide alternative energizing circuits for the windings of switches 1F, 2F or 1B, 2B, but subject to closure of a switch 31, which is closed only when the cylinder 13 is locked against rotation as hereinafter described, and simultaneous closure of switch 32 which is closed only upon opening of the tub door 12.

Closure of said alternative energizing circuits is further dependent upon closure of switch 33 by depression of the "start" button 34 thereof, the "stop" button 35 of said switch being operable at will to interrupt all of said alternative energizing circuits. Operation of motor M to hoist the cylinder 13 from the tub is dependent upon depression of "hoist" button 36 of switch 37, and is further dependent upon closure of a normally closed limit switch $LS^1$ which is controlled by a traveling nut 38 (Fig. 1) which is operable by any suitable gearing (not shown) in a direction and to a degree corresponding with the upward movement of the cylinder 13. Operation of motor M in the reverse direction to lower cylinder 13 is dependent upon depression of push button 39, as shown in Fig. 4, and is further dependent upon closure of a normally closed limit switch $LS^2$.

It should be further noted that completion of the energizing circuit of relay CR and of the switches controlled thereby is dependent upon closure of a switch 40 which is normally biased to closed position upon release of the mechanical brake 41 but is operable by a cam 42 to open position upon application or setting of the brake as hereinafter set forth. Energization of relay CR is further dependent upon closure of a switch 43 which is closed upon closure of tub-door 12.

Completion of each of the aforementioned energizing circuits is further dependent upon closure of the normally closed contacts $OL^1$ of an overload relay, the winding OL of which is connected in series with the motor armature. The arrangement is such that in the event of opening of contacts $OL^1$ due to an overload during the washing period, the start button 22 must again be depressed to provide for completion of the energizing circuit of relay CR upon rotation of drum D to one of its off positions,—thus insuring inclusion of the proper amount of resistance in the motor circuit at all times during starting. However, in the event that contacts $OL^1$ are opened during hoisting or lowering of the cylinder the previously existing circuit will be again completed automatically upon reclosure of said contacts.

The complete cycle of operation of the device will now be described with reference to the several figures of the drawings, and the electric circuits will be traced with particular reference to Fig. 4. Assuming positioning of the various mechanical and electrical elements as shown in full lines in the several figures, and further assuming closure of contacts $K^1$, $K^2$ of the usual knife switch, the arrangement is such that upon depression of the aforementioned push button 22 the later must be held closed pending movement of drum D to a position wherein segments $23^d$, $24^d$ or $23^c$, $24^c$ engage contacts 23, 24. With segments $23^d$, $24^d$ in engagement with contacts 23, 24, as shown, an energizing circuit for the winding of relay CR extends from line $L^1$ by conductor 44 through contacts and segments $T^1$, $T^{11}$, $T^{12}$ and $T^2$ of transfer switch T (which is in the "wash" position), contacts of switch 40, which is closed due to release of the brake 41, contacts of switch 43, which is closed due to closure the tub door 12, contacts of "start" button 22, thence through contacts and segments 24, $24^d$, $23^d$ and 23 of drum D, through the winding of relay CR, and through contacts $OL^1$ of the overload relay to line $L^2$. Relay CR in closing provides a maintaining circuit through its contacts $CR^2$, $CR^1$, said circuit shunting the switch 22 and the aforementioned contacts and segments 24, $24^d$, $23^d$ and 23 of drum D, as will be obvious.

Upon continued rotation of drum D unidirectionally, as indicated by the arrow in Fig. 1, the segments $25^a$, $26^a$ will be caused to engage contacts 25, 26, thus completing an energizing circuit for the windings of switches 1F and 2F; which circuit extends from line $L^1$ through the contacts of switch 43, by conductor 45 through the contacts $CR^2$ of relay CR, conductor 46 through contacts and segments 25, $25^a$, $26^a$ and 26 of the drum, conductor 47 through said windings in parallel, and by conductor 48 through contacts $OL^1$ of the overload relay to line $L^2$.

Closure of switches 1F and 2F completes a circuit for the armature and series field of motor M inclusive of the resistance sections $R^2$, $R^1$, said circuit being obvious. Due to closure of the normally closed contacts $2R^1$ of switch 2R, resistance section $R^3$ is included in a shunt circuit around the armature of motor M. However, segment $28^a$ is engaged with contact 28 of the drum and upon continued rotation of the latter segment $29^a$ will engage contact 29 to complete the energizing circuit of switch 2R, and the latter in closing not only short circuits the resistance section $R^1$ to provide for acceleration of the motor, but the contacts $2R^1$ of said switch are opened to interrupt the shunt circuit through resistance $R^3$. The energizing circuit for switch 2R extends from line $L^1$ to conductor 45, thence through contacts $CR^2$, $CR^1$ of relay CR, conductor 49, contacts and segments 28, $28^a$, $29^a$, 29, through the winding of said switch, and by conductor 48 through overload contacts $OL^1$ to line $L^2$.

Thereafter segment $30^a$ engages contact 30 of the drum to complete the energizing circuit of switch 3R, the winding of switch 3R being then connected in parallel with the winding of switch 2R, as will be obvious. Closure of switch 3R short circuits resistance $R^2$, thereby connecting the motor armature and series field directly across the line for full speed operation of the motor.

After a predetermined period of operation of the motor at full speed the segments $25^a$, $26^a$, $28^a$, $29^a$ and $30^a$ simultaneously disengage their respective contacts, with consequent opening of switches 1F, 2F, 2R and 3R to interrupt the armature circuit. Moreover, the auxiliary contacts $2R^1$ of switch 2R will reclose to provide a dynamic braking loop around the motor armature to provide for deceleration thereof to a relatively low speed prior to reversal of the motor circuit connections.

Thus upon continued rotation of drum D segments $25^b$, $27^b$ will engage contacts 25, 27 to complete the energizing circuit of switches 1B, 2B; the reverse circuit connections provided upon closure of said switches being obvious. Resistance $R^3$ will again be initially included in shunt around the motor armature, and thereafter switch 2R will be energized to short circuit resistance R1 through closure of its main contacts, and the contacts $2R^1$ thereof will be opened to disconnect resistance $R^3$ from circuit. Thereafter switch 3R will be closed to short circuit resistance $R^2$ and the motor will operate at full speed in such reverse direction for a predetermined period, whereupon interruption of the motor circuit connections and deceleration of the motor will be effected prior to repeated starting, acceleration and running thereof in the forward direction as aforedescribed.

The aforedescribed operation of the motor, including periodic reversal and acceleration thereof, is continued until stopped at will by the operator,—but it is to be understood that any well known timing means for automatically interrupting the motor circuit connections may be employed if desired. With the arrangement illustrated, however, when it is desired to stop the motor and the cylinder 13 driven thereby the lever 50 (marked "brake lever and master control station" in Fig. 1) is pulled outwardly from the machine toward the operator. This action engages a jaw clutch 51 (Fig. 2) and causes the energy represented by the rotating cylinder 13 to engage the mechanical brake 41 (through the medium of levers 52, 53, 54, shaft 55 and eccentrics 56 and 57). At the same time cam 42 on shaft 55 causes opening of switch 40 which deenergizes relay CR with consequent opening of any of the switches controlled thereby which may have been in closed position. Setting of brake 41 thus brings to a stop the motor M and cylinder 13 driven thereby, the arrangement being such that the unloading door (not shown) of cylinder 13 is brought approximately, at least, to a predetermined angular position at the time of stopping, such angular positioning or "spotting" being more positively effected by the aforementioned locking operation of the cylinder.

Then the operator pushes the lever 50 inwardly toward the machine and this causes a pin 58 to lock cylinder 13 in a predetermined angular or rotary position to its bearing in one of the lifting gears 18, so that the cylinder will not rotate after the driving pinions (not shown) are unmeshed from the gears (not shown) on the cylinder. This operation at the same time causes release of the brake. With the cylinder locked, the lever 59 (marked "unload control lever" in Fig. 1) is pulled outwardly from the machine toward the operator.

This movement, through the medium of rod 60 and eccentric 61, causes rotation of a shaft 62, and through suitable means, such as levers 63, 64, the transfer switch T is moved from the "wash" position to the "unload" position. Keyed or otherwise rigidly secured to shaft 62 is a pin 65 which operates within a cam slot 66 in a housing 67 to cause endwise movement of shaft 62 upon rotation thereof. Such endwise movement of shaft 62 is transmitted to a shaft 68 to operate the change-speed gearing located within box 69,—the adjacent enlarged ends of shafts 62 and 68 being provided with a suitable slip housing 70 to prevent transmission of the subsequent rotary movement of the latter to the former.

The drive shaft of the motor will then be mechanically connected through suitable low speed gearing to the lifting gears 18, and upon depression of "hoist" push button 36 and depression of "start" push button 34 a circuit will be completed for the windings of switches 1F and 2F whereby motor M is operated at a relatively slow speed in a direction to cause hoisting of the cylinder 13 to its unloading position, as shown in dotted lines in Fig. 2.

Said circuit may be traced in Fig. 4 from line $L^1$ by conductor 44 through contacts and segments $T^1$, $T^{111}$, $T^{113}$, $T^3$ conductor 71 through switches 31 and 32 (which are then in closed position as aforedescribed), through switch 33 and contacts 72, 73 of switch 37, through limit switch $LS^1$ (which is closed and will remain closed until cylinder 13 reaches its upper extreme position), thence through the windings of switches 1F and 2F in parallel to line $L^2$ in the manner aforedescribed.

With transfer switch T in the "unload" position as just described it will be noted that relay CR cannot be energized. Hence notwithstanding the continued rotation of drum D the accelerating switches 2R and 3R cannot be brought in, and motor M will be operated at a fixed low speed, as determined by the value of resistances $R^1$, $R^2$ and the resistance $R^3$ which is connected in shunt to the motor armature by continued closure of contacts $2R^1$ of switch 2R.

When cylinder 13 has reached its upper extreme position limit switch $LS^1$ will be opened automatically to interrupt the motor circuit connections. The arrangement is preferably such that cylinder 13 will remain in its upper extreme position.

After the material has been discharged from cylinder 13 into a suitable receptacle or receptacles (such as the two halves of an extractor basket) the cylinder 13 may be lowered at the same low speed of motor M by merely depressing the "lowering" push button 39, which completes an energizing circuit for the windings of switches 1B, 2B through the limit switch $LS^2$ which is then in its normally closed position,—said circuit being obvious from the diagram of Fig. 4.

As will be appreciated, very accurate control of the cylinder in the lowering movement thereof is required so as to avoid excessive impact of the gears (not shown) on the two ends of the cylinder when the same re-engages the driving pinions. This result is accomplished by insuring inclusion in circuit of resistances $R^1$, $R^2$ and by the provision of the aforementioned step of resistance across the motor armature, so that hoisting and lowering of the cylinder is effected at a fixed low speed of the motor, with inherent control over the overhauling load during lowering and with the proper amount of torque during hoisting.

When the cylinder has been lowered to the "washing" position thereof, as illustrated in full lines in the several figures, the cylinder may be refilled with material to be washed or otherwise treated. Lever 50 is then moved to its intermediate position (shown in full lines in Fig. 2) to unlock the cylinder shaft from its bearing; and thereafter lever 59 is moved inwardly to the position illustrated in Fig. 1 to reconnect the motor to the cylinder through suitable driving gearing; transfer switch T being simultaneously operated to preset the control circuits for initiation of the washing cycle upon depression of push button switch 22, as aforedescribed.

Figure 6:
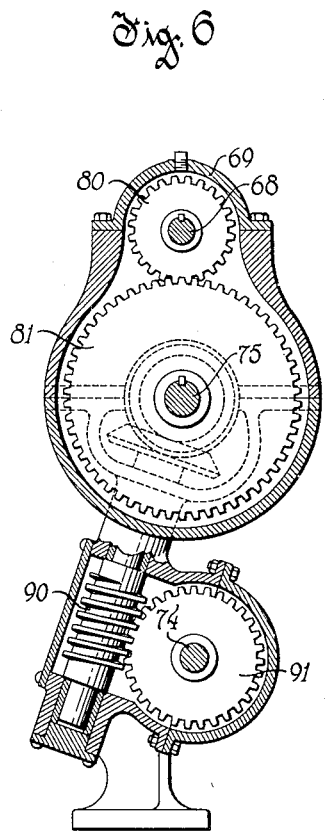
Fig. 6 is an end view, in section, of certain of the parts illustrated in Fig. 5.

Referring more particularly to Figs. 5 and 6, the change-speed gearing 69 (of Fig. 1) comprises a spur gear 80 which is fixed to and slidable with the drive shaft 68 of the motor, from the neutral or intermediate position illustrated in opposite directions to respectively engage and drive the gears 81 and 82. Gear 81 is keyed or otherwise fixed to the shaft 75, so that upon meshing of gears 80 and 81 the shaft 75 is driven. Fixed to opposite ends of shaft 75 are a pair of sprocket gears, one of which is shown in dotted lines at 78 in Fig. 2, and spaced downwardly from the gears 78 are a pair of relatively larger sprocket gears, one of which is shown in dotted lines at 79 in Fig. 2. The sprocket gears 79 are fixed to a shaft 76, and the gears 78, 79 of each set are connected by means of suitable endless chains, one of which is shown in dotted lines at 77 in Fig. 2.

Figure 7:
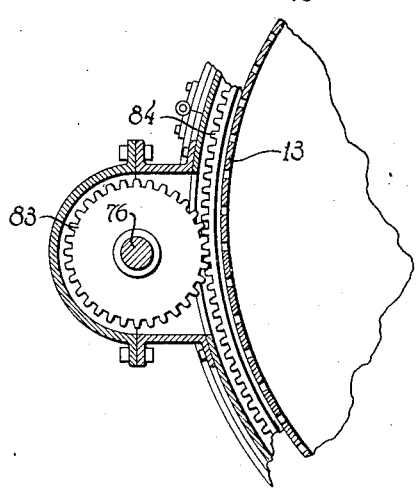
Fig. 7 is a sectional view illustrating certain elements of the gearing for effecting rotation of the washer cylinder.

Spaced inwardly of the gears 79 and likewise keyed or otherwise fixed to shaft 76 are a pair of spur gears, one of which is shown at 83 in Fig. 7. The gears 83 are respectively adapted for driving engagement with the gear teeth 84 peripherally arranged around and attached to the opposite ends of cylinder 13. By the means aforedescribed a positive driving connection is provided between motor M and cylinder 13 for the washing operation.

The gear 82 aforementioned is loosely mounted upon and rotatable independently of the shaft 75. Gear 82 is provided with an integral hub portion 85 to which is rigidly secured a bevel gear 86, as by means of a set screw or locking bolt 87. Bevel gear 86 meshes with a bevel gear 88 fixed to an angle-shaft 89 having a suitable bearing and provided at its lower end with a worm gear 90 which meshes with and drives a gear 91 (Fig. 6) fixed to the shaft 74. Also fixed to the shaft 74 and adapted to mesh with the gears 21 at opposite ends of the tub or casing 10 are a pair of spur gears, one of which is shown at 92 in Fig. 2. As aforestated the gears 21 are adapted to mesh with the teeth 19 of the respective segmental lifting gears 18. As shown in Figs. 1 and 2 the gears 21 are respectively carried by stub shafts 93, each of which bears at one end in a suitable journal in the respective gear casings or enclosures 94.

It will be noted that relay CR performs the double purpose of insuring against starting of the motor for the washing operation except when drum D is in an "off" position, to thereby protect the motor, and further insuring against energization of the accelerating switches during hoisting and lowering of the cylinder.

While I prefer to employ the switch 40 to effect interruption of the motor circuit connections automatically upon application of the brake through operation of lever 50 in the manner aforedescribed, it is to be understood that a normally closed manually operable switch may be included in circuit in series with "start" switch 22 for this purpose if desired.

The means aforedescribed are shown as adapted for control of a direct current motor, whereas the control system for an alternating current motor would be similar, except that no provision would be made to insure inclusion of a current limiting resistance during starting.

What I claim as new and desire to secure by Letters Patent is:

1. In combination, a device to be rotatably driven, an electric driving motor to be connected therewith, means operable at will to effect disconnection of said motor from said device, said means being also operable to effect connection of said motor to an element for raising and lowering said device, and means subject to control by said former means for insuring relatively slow speed operation of said motor during raising and lowering of said device.

2. In combination, a device to be rotatably driven, an electric driving motor to be connected therewith, means to effect stopping of the motor and the device driven thereby, means to effect mechanical disconnection of said motor from said device, said means being also operable to simultaneously effect connection of said motor to an element to provide for raising and/or lowering of said device with respect to its normal position, and electroresponsive control means for said motor to insure a predetermined constant slow speed thereof during raising and/or lowering movement of said device.

3. In combination, a device to be rotatably driven, a reversible electric driving motor to be connected therewith, means subject to manual control for initially completing an energizing circuit for said motor, means operable automatically thereafter for effecting periodic reversal of operation of said motor, means operable at will to effect interruption of the circuit connections of the motor and to stop the latter irrespective of the instantaneous direction of operation thereof, an auxilary oscillatable support for said device, manually controlled means operable to disconnect the motor from said device and to simultaneously connect the motor to said support, manually controlled means operable independently of the aforementioned reversing means to effect forward and reverse operations of said motor to raise and lower said device while the latter is restrained against rotation, said last mentioned means including means to commutate the circuit connections of said motor to insure a predetermined constant slow speed thereof during raising and/or lowering of said device.

4. In combination, a device to be rotatably driven, a reversible electric driving motor therefor, means subject to manual control for initially completing an energizing circuit for said motor, means operable automatically thereafter for effecting acceleration and periodic reversal of operation of said motor, means operable at will to effect interruption of the circuit connections of the motor and to stop the latter irrespective of the instantaneous speed and/or direction of operation of the latter, an auxiliary oscillatable support for said device, and means to disconnect the motor from said device and to simultaneously connect the motor to said support, said means including means for presetting the motor circuit connections for control independently of the aforementioned reversing means whereby said motor may be operated in either direction at will to raise and/or lower said device with respect to its normal operative position, said last mentioned means also including means to insure a predetermined constant slow speed of the motor and of the support driven thereby during raising and/or lowering of said device.

5. In combination, a device to be rotatably driven, a reversible electric driving motor therefor, means subject to manual control for initially completing an energizing circuit for said motor, means operable automatically thereafter for effecting acceleration and periodic reversal of operation of said motor, said means including a continuously and unidirectionally operable control drum, means operable at will to effect interruption of the circuit connections of the motor and to stop the latter irrespective of the instantaneous speed and/or direction of operation of the latter, a plurality of segmental lifting gears forming an auxiliary support for said device, and means including changespeed gearing to disconnect the motor from said device and to simultaneously connect the motor to said support, said means including means for presetting the motor circuit connections for control independently of the aforementioned reversing means whereby said motor may be operated in either direction at will to raise and/or lower said device with respect to its normal operative position, said last mentioned means also including means to insure a predetermined constant slow speed of the motor and of the support driven thereby during raising and/or lowering of said device.

6. In combination, a tub, a cylinder mounted therein upon a horizontal axis, an electric driving motor for said cylinder, control means for said motor for initially completing a circuit therefor and for thereafter automatically effecting acceleration and periodic reversal of operation of said motor, means for interrupting the circuit connections to effect stopping of the motor irrespective of the instantaneous speed and/or direction of operation of the latter, manually operable means for locking said cylinder against rotation upon stopping of said motor, an auxiliary oscillatable support for said cylinder, means for transferring the drive of said motor from said cylinder to said support, and means operable independently of the first mentioned control means for effecting operation of the motor in reverse directions selectively at a predetermined constant slow speed for raising and lowering said cylinder with respect to said tub.

7. In combination, a tub, a cylinder mounted therein upon a horizontal axis, an electric driving motor for said cylinder, control means for said motor for initially completing a circuit therefor and for thereafter automatically effecting acceleration and periodic reversal of operation of said motor, means for interrupting the circuit connections to effect stopping of the motor irrespective of the instantaneous speed and/or direction of operation of the latter, manually operable means for locking said cylinder against rotation upon stopping of said motor, an auxiliary oscillatable support for said cylinder, means for transferring the drive of said motor from said cylinder to said support, and means operable independently of the first mentioned control means for effecting operation of the motor in reverse directions selectively at a predetermined constant slow speed for raising and lowering said cylinder with respect to said tub, said means including a plurality of normally closed limit switches respectively operable automatically at each extreme position of said cylinder to effect interruption of the motor circuit connections.

8. In combination, a tub, a cylinder mounted therein upon a horizontal axis, an electric driving motor for said cylinder, control means for said motor for initially completing a circuit therefor and for thereafter automatically effecting acceleration and periodic reversal of operation of said motor, means for interrupting the circuit connections to effect stopping of the motor irrespective of the instantaneous speed and/or direction of operation of the latter, manually operable means for locking said cylinder against rotation upon stopping of said motor, an auxiliary oscillatable support for said cylinder, means for transferring the drive of said motor from said cylinder to said support, means operable independently of the first mentioned control means for effecting operation of the motor in reverse directions selectively at a predetermined constant slow speed for raising and lowering said cylinder with respect to said tub, said means including a plurality of normally closed limit switches respectively operable automatically at each extreme position of said cylinder to effect interruption of the motor circuit connections, and a three-point push button switch having contacts to cooperate alternately with said limit switches.

9. In combination, a cylinder to be rotatably driven upon a horizontal axis, a reversible electric driving motor therefor, a movable support for said cylinder, means comprising change speed gearing for disconnecting said motor from said device, said means being also adapted to provide a driving connection between said motor and said support, manual control means whereby said motor may be operated in reverse directions selectively to raise and lower said support and the cylinder carried thereby, means operable automatically to limit the raising and lowering movements of said support, and means for insuring relatively slow speed operation of said motor in the respective directions during raising and lowering of said support.

10. In combination, a cylinder to be rotatably driven upon a horizontal axis, an electric driving motor therefor, control means for said motor, said means including means for automatically effecting periodic reversal of operation of said motor during driving of said cylinder thereby, an oscillatable support for said cylinder, means for disconnecting said cylinder from said motor and for simultaneously providing a driving connection between the latter and said support, manual control means for thereupon effecting operation of said motor in reverse directions selectively to raise and lower said support and the cylinder carried thereby, additional control means for said motor operable automatically in accordance with the degree of movement of said support in opposite directions respectively, and means for insuring relatively slow speed operation of said motor and said support during movement of the latter in either direction.

11. In combination, a tub, a cylinder mounted for rotation therein upon a horizontal axis, a driving motor for said cylinder, a transfer switch, a tub door switch, a control drum, a normally open push button switch and an electroresponsive relay the energizing circuit of which is initially subject to control by said drum and said switches jointly, said relay being adapted upon closure thereof to complete a maintaining circuit therefor independently of said push-button switch and said drum, electroresponsive reversing switches for said motor, means subject to control by said relay and said drum for selectively controlling said reversing switches, said drum being operable continuously to effect periodic reversal and acceleration of said motor, a mechanical brake, manually controlled means for interrupting the motor circuit connections and for effecting application of the brake irrespective of the instantaneous speed and direction of operation of the motor, means operable thereafter to lock the cylinder against rotation, an auxiliary support for the cylinder, said support including a plurality of segmental lifting gears and manually operable means including change-speed gearing for shifting the drive of said motor from said cylinder to said lifting gears, said last mentioned means including means for effecting simultaneous operation of said transfer switch to provide for manual control of said reversing switches independently of said drum and said relay to thereby insure against acceleration of said motor beyond a predetermined relatively slow speed during raising and/or lowering of said cylinder through the medium of said lifting gears.

12. In combination, a tub, a cylinder mounted for rotation therein upon a horizontal axis, a driving motor for said cylinder, a transfer switch, a tub door switch, a control drum, a normally open push button switch and an electroresponsive relay the energizing circuit of which is initially subject to control by said drum and said switches jointly, said relay being adapted upon closure thereof to complete a maintaining circuit therefor independently of said push-button switch and said drum, electroresponsive reversing switches for said motor, means subject to control by said relay and said drum for selectively controlling said reversing switches, said drum being operable continuously to effect periodic reversal and acceleration of said motor, a mechanical brake, manually controlled means for interrupting the motor circuit connections and for effecting application of the brake irrespective of the instantaneous speed and direction of operation of the motor, means operable thereafter to lock the cylinder against rotation, an auxiliary support for the cylinder, said support including a plurality of segmental lifting gears, manually operable means including change-speed gearing for shifting the drive of said motor from said cylinder to said lifting gears, said last mentioned means including means for effecting simultaneous operation of said transfer switch to provide for manual control of said reversing switches independently of said drum and said relay to thereby insure a constant relatively slow speed operation of the motor during raising and/or lowering of said cylinder through the medium of said lifting gears, said last mentioned control means including a three-point push button switch, and a pair of normally closed limit switches alternately cooperable with said push button switch and operable automatically to interrupt the motor circuit connections at the respective extreme raised and lowered positions of said cylinder.

In witness whereof, I have hereunto subscribed my name.

RALPH G. LOCKETT.